June 1, 1965   L. F. COLE ETAL   3,186,665
BICYCLE LICENSE PLATE BRACKET
Filed Nov. 16, 1962
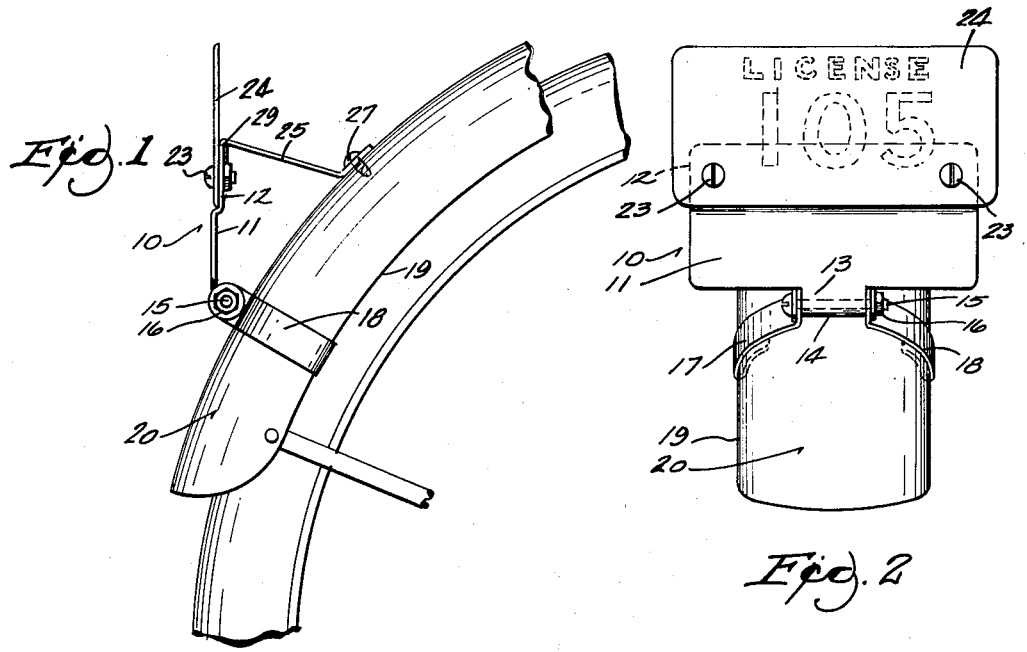
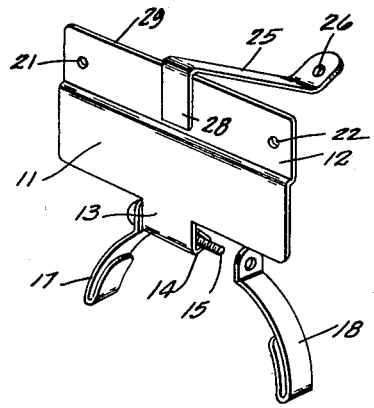
INVENTORS
LEO F. COLE
JOSEPH A. PFLAGER
BY
Gerald P. Welch
ATTORNEY 3,186,665
BICYCLE LICENSE PLATE BRACKET
Leo F. Cole, 5377 N. 34th St., and Joseph A. Pflager, 3218 W. Cameron Ave., both of Milwaukee 9, Wis.
Filed Nov. 16, 1962, Ser. No. 238,147
1 Claim. (Cl. 248—28)

This invention relates to improvements in bicycle license plate brackets and more particularly to a novel bicycle license plate bracket adapted for attachment to the bicycle mudguard in any position.

An object of the invention is to provide a device of the type which will support a license plate in vertical position on the slanted mudguard.

Another object of the invention is to provide a device of the type which may be affixed to either the narrow or the wide mudguards.

Other and further objects of the invention will appear as the description proceeds, reference being had to the accompanying drawing, in which:

FIG. 1 is a side view in elevation of a bicycle license plate bracket embodying the invention in position on the rear end of a bicycle supporting a license plate.

FIG. 2 is a front view in elevation of the bracket and supported plate.

FIG. 3 is a view in perspective from above of the license plate bracket assembly.

Referring more particularly to the drawings, the numeral 10 refers to the device generally comprising a plate 11 provided with an upper offset portion 12, and a depending portion 13 terminating at its lower end in an angular horizontal sleeve 14, accommodating the bolt 15 provided with the nut 16 to secure a pair of arcuate clips 17 and 18 which are adapted to engage the edges 19 of a bicycle mudguard 20 as shown in FIGS. 1 and 2.

The offset portion 12 is apertured at 21 and 22 to accommodate fastening means 23 for the license plate 24. A retainer element 25 is apertured at 26 to accommodate a screw 27 which anchors said element to the mudguard 20. The opposite end of the retainer element 25 has a downturned tab 28 which engages over the upper edge 29 of the offset portion 12 and is clamped between the bottom of the license plate 24 and said offset portion 12 by pressure of the fastening means 23. The lower part of plate 11 is well adapted to carry designs or slogans or the name or nickname of the cyclist.

It will be understood that the device is capable of modifications in structure and design, without departing from the spirit of the invention, within the scope of the appended claim.

Having thus described the invention, what is claimed and desired to be secured by Letters Patent of the United States, is:

We claim:

A license plate bracket for bicycles including a vertical plate, the upper portion of said plate offset to form a horizontal shoulder for support of a license plate, a portion centrally of said plate depending therefrom and formed as a short sleeve triangular in cross-section, a bolt in said sleeve, a pair of arcuate strap clips on the ends of said bolt, each clip having a parallel return portion to engage the underside of a bicycle mudguard, and a strap prop bent to engage over the top of the top offset portion of the vertical plate with the body thereof inclined at a downward angle with an apertured bent portion at the lower end thereof for fastening to a bicycle mudguard.

References Cited by the Examiner
UNITED STATES PATENTS
2,891,748  6/59  Winegard _____ 248—46
FOREIGN PATENTS
287,664  3/28  Great Britain.
414,039  6/46  Italy.

CLAUDE A. LE ROY, Primary Examiner.